United States Patent
Diluoffo et al.

(10) Patent No.: US 7,561,059 B2
(45) Date of Patent: Jul. 14, 2009

(54) ANTI-TAMPER ELECTRONIC OBSCURITY USING E-FUSE TECHNOLOGY

(75) Inventors: Vincent V. Diluoffo, Sandy Hook, CT (US); Raymond J. Eberhard, Endwell, NY (US)

(73) Assignee: International Business Machines Corporation, Armonk, NY (US)

( * ) Notice: Subject to any disclaimer, the term of this patent is extended or adjusted under 35 U.S.C. 154(b) by 426 days.

(21) Appl. No.: 11/558,137

(22) Filed: Nov. 9, 2006

(65) Prior Publication Data

US 2008/0111682 A1    May 15, 2008

(51) Int. Cl.
*G08B 21/00* (2006.01)
(52) U.S. Cl. .................. 340/638; 340/509; 340/590; 340/635; 340/636.13; 340/636.17; 340/652; 361/104; 327/525; 327/526
(58) Field of Classification Search ............ 340/638, 340/507, 509, 590, 636.13, 636.17, 635, 340/652, 653, 309.6; 361/42, 104; 327/525, 327/526
See application file for complete search history.

(56) References Cited

U.S. PATENT DOCUMENTS

| | | | | | |
|---|---|---|---|---|---|
| 5,291,139 | A | * | 3/1994 | Fruhauf et al. | 324/550 |
| 6,566,937 | B1 | * | 5/2003 | Mori et al. | 327/525 |
| 6,606,228 | B1 | * | 8/2003 | Potter, IV | 361/104 |

* cited by examiner

*Primary Examiner*—Hung T. Nguyen
(74) *Attorney, Agent, or Firm*—Bockhop & Associates, LLC

(57) ABSTRACT

A circuit that employs an anti-tamper sensor includes a circuit element that is responsive to a first input and to a second input. A selective coupling element couples the circuit element to the first input and is responsive to the anti-tamper sensor. The selective coupling element has a first state that allows the circuit element to operate normally when the anti-tamper sensor does not detect a tamper condition and is configured to enter a second state that causes the circuit element to become inoperable when the anti-tamper sensor detects a tamper condition. A decoy coupling element is disposed between the second input and the circuit element and has an appearance corresponding to the selective coupling element. The decoy coupling element will cause the circuit element not to operate normally if the decoy coupling element has a selected physical property of the selective coupling element in the first state.

17 Claims, 2 Drawing Sheets

ANTI-TAMPER ELECTRONIC OBSCURITY USING E-FUSE TECHNOLOGY

BACKGROUND OF THE INVENTION

1. Field of the Invention

The present invention relates to electronic circuits and, more specifically, to an electronic circuit that increases the difficulty associated with reverse engineering.

2. Description of the Prior Art

Reverse engineering is a common way for someone to misappropriate technology, such as electronic circuits. Typically, the reverse engineer disassembles an apparatus to determine how its component parts interact. In the case of application specific integrated circuits (ASICs), a reverse engineer may cut off successive layers of a circuit package and image them to determine the placement of the various circuit components that make up the ASIC.

One way to guard against reverse engineering is to include a plurality of anti-tamper fuses in critical data paths of a circuit. The fuses are coupled to a tampering detection device that causes the fuses to blow when the circuit is being tampered with. Since the fuses are in a critical data path of the circuit, the blowing of the fuses causes the circuit to malfunction.

Certain imaging systems, such as thermal imaging systems, allow a reverse engineer to make an image of internal portions of a circuit without having to cut into the circuit, or otherwise trigger a tampering detection device. The reverse engineer is able to examine the image of the circuit to determine both placement of the circuit elements and the fuses. By replicating the circuit elements and the fuses, or by replicating the circuit elements and replacing the fuses with short circuits, the reverse engineer is able to replicate the functionality of the circuit.

Such reverse engineering can cost circuit manufacturers considerable losses through misappropriation of trade secrets. Also, reverse engineering can result in the loss of classified information about the operation of military circuits.

Therefore, there is a need for a system that frustrates reverse engineering of circuits through the use of imaging systems.

There is also a need for a system that renders a reverse engineered circuit inoperable.

SUMMARY OF THE INVENTION

The disadvantages of the prior art are overcome by the present invention which, in one aspect, is a circuit that employs an anti-tamper sensor and that includes a circuit element that is responsive to a first input and to a second input. A selective coupling element couples the circuit element to the first input and is responsive to the anti-tamper sensor. The selective coupling element has a first state that allows the circuit element to operate normally when the anti-tamper sensor does not detect a tamper condition. The first selective coupling element is also configured to enter a second state that causes the circuit element to become inoperable when the anti-tamper sensor detects a tamper condition. A decoy coupling element is disposed between the second input and the circuit element and has an appearance corresponding to the selective coupling element. However, the decoy coupling element will cause the circuit element not to operate normally if the decoy coupling element has a selected physical property of the selective coupling element in the first state.

In another aspect, the invention is a reverse engineering-resistant circuit that employs an anti-tamper sensor. A first fuse, configured to blow when the anti-tamper sensor detects a tampering condition, is integrated with the circuit so as to render the circuit inoperable when the first fuse is blown. A decoy fuse is blown prior to initial operation of the circuit and that is configured so that if a copy of the circuit is made with the decoy fuse intact, then the copy of the circuit will not operate normally.

In yet another aspect, the invention is a method of preventing tampering with and reverse engineering of a circuit that is equipped with an anti-tamper sensor at least one anti-tamper fuse is coupled into a first selected circuit path so that the circuit will operate normally if the fuse is intact and so that the circuit will not operate normally if the fuse is blown. The anti-tamper fuse is responsive to the anti-tamper sensor so that the anti-tamper fuse blows when the anti-tamper sensor detects a tamper condition. At least one decoy fuse is coupled into a second selected circuit path so that the circuit will operate normally if the decoy fuse is blown and so that the circuit will not operate normally if the decoy fuse is intact. The decoy fuse is blown prior to initial operation of the circuit.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
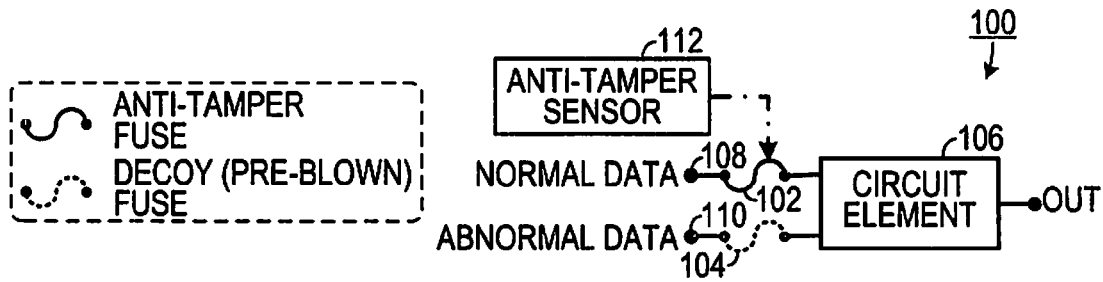
FIG. 1 is a schematic drawing of a second embodiment of a reverse engineering-resistant circuit.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

As shown in FIG. 1, one embodiment is a circuit 100 that includes a circuit element 106 that is responsive to a first input 108 and to a second input 110. A selective coupling element 102, such as a fuse, couples the circuit element 106 to the first input 108. The first selective coupling element 102 is responsive to an anti-tamper sensor 112 and has a first state (e.g., not blown, in the fuse example shown) that allows the circuit element to operate normally when the anti-tamper sensor does not detect a tamper condition. The first selective coupling element 102 is also configured to enter a second state (e.g., blown in the fuse example shown), which causes the circuit element 106 to become inoperable, when the anti-tamper sensor 112 detects a tamper condition. A decoy coupling element 104, such as a fuse that is purposely blown prior to the initial use of the circuit element 106, is disposed between the second input 110 and the circuit element 106. The decoy coupling element 104 has an appearance similar to the selective coupling element 102, but it causes the circuit element 106 not to operate normally if the decoy coupling element 104 has a selected physical property of the selective coupling element 102 in the first state.

For example, if one images the circuit 100 in attempt to reverse engineer it, the decoy coupling element 104 would have an appearance similar to that of the selective coupling element 102 and thus, the resulting reverse engineered circuit would allow data from the second input 110 to be fed into the circuit element 106, causing the circuit 100 to malfunction.

Figure 2A:
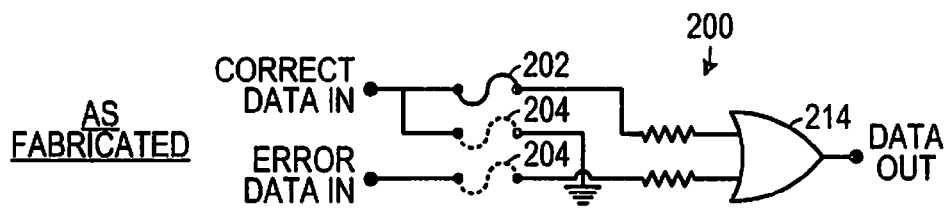
FIGS. 2A-2D are schematic drawings of one embodiment of a reverse engineering-resistant circuit.

This concept is demonstrated in greater detail in FIGS. 2A-2D. As shown in FIG. 2A, a circuit 200, as manufactured, includes a logic element 214 that is capable of receiving correct data and error data. The correct data path includes an anti-tamper fuse 202 that is coupled to a tamper sensing circuit (not shown in this figure). One or more decoy fuses 204 may be used to make the circuit 200 malfunction if the decoy fuses 204 are not blown prior to use. The decoy fuses 204 may be placed close to anti-tamper fuses 202 to make it difficult for a reverse engineer to tell them apart. Both the anti-tamper fuses 202 and the decoy fuses 204 could be e-fuses.

Figure 2B:
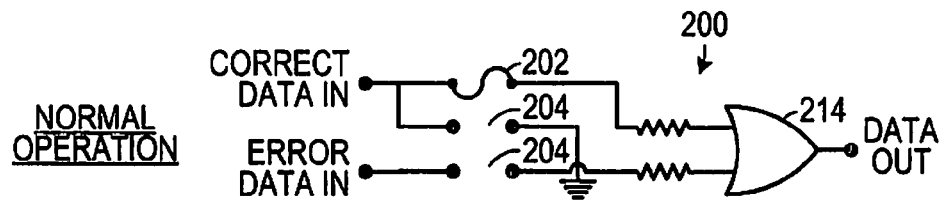

In normal operation, as shown in FIG. 2B, the decoy fuses 204 are pre-blown prior to initial operation (which could take place at the factory or during a first use initialization of the circuit 200) and act as open circuits that prevent the error data from propagating to the logic element 214. Thus, the circuit in this configuration will allow only the normal data to pass through to the logic element 214.

Figure 2C:
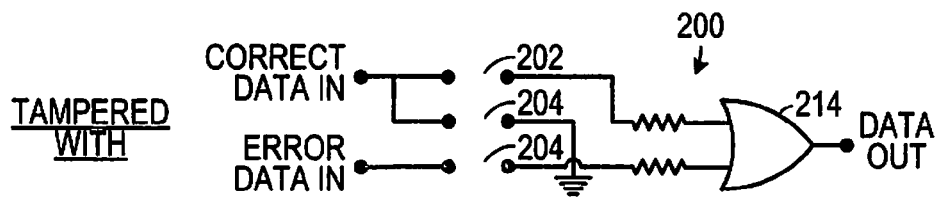
Figure 2D:
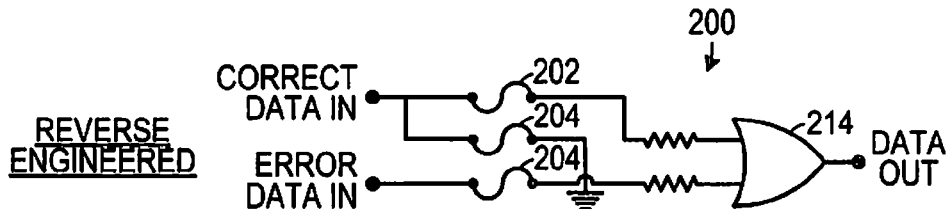

If the circuit 200 is tampered with, as shown in FIG. 2C, the anti-tamper fuse 202 will blow and all data paths to the logic element 214 will appear as open circuits, thereby preventing normal operation of the circuit 200. On the other hand, as shown in FIG. 2D, if the circuit 200 is reverse engineered and if the reverse engineer is fooled by the decoy fuses 204, then the decoy fuses 204 will behave as closed circuits and will cause the incorrect data to propagate to the logic element 214 when operation of the circuit 200 is attempted. In fact, in the example of FIG. 2D, failure to blow the decoy fuses 204 will cause the correct data to be shunted to ground, while the error data will propagate through to the logic element 214. Reverse engineers may be further frustrated in trying to understand the circuit 200 using such techniques as, for example, thermal recognition, by placing the decoy fuses 204 physically close to the anti-tamper fuses 202.

Figure 3:
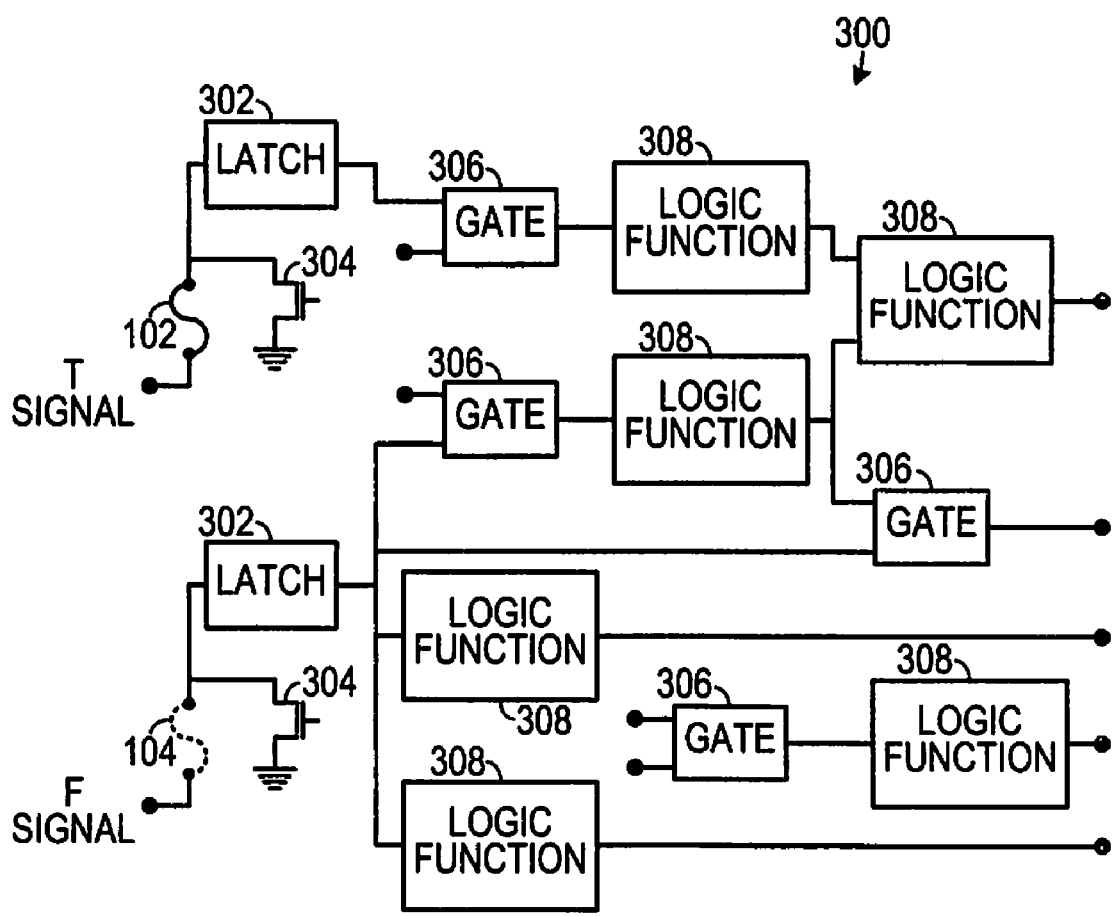
FIG. 3 is a schematic drawing of a third embodiment of a reverse engineering-resistant circuit.

A more complicated example is shown in FIG. 3, in which a logic circuit 300 includes a plurality of logic functions 308 and gates 306. A signal (T Signal), which transmits proper data, is coupled to a latch 302 through an anti-tamper fuse 102 and thereby latched into the logic circuit 300. Another signal (F Signal), which transmits erroneous data, is also latched into the circuit 300 through a decoy fuse 104. The decoy fuse 104 is blown prior to initial use, thereby allowing correct data to propagate through the circuit 300. If a copy of the circuit 300 were to be made with the decoy fuse 104 not blown, then the F signal would be allowed to propagate through the circuit 300, thereby causing the circuit 300 not to operate normally.

The above-disclosed embodiments can employ design synthesis technology, e-fuse technology, manufacturing process technology, and tamper response circuitry to prevent reverse engineering (such as by use of thermal, electrical, chemical, mechanical, or x-ray techniques, etc.), and to deter future use of copied circuits. This may be done by strategically defining, assigning, and interconnecting two sets of e-fuses—a set of decoy fuses and a set of anti-tamper fuses.

The set of decoy e-fuses has a state coupled with the detailed function to define the secret. The set of anti-tamper e-fuses has a tamper state disable function and enable rogue function. Thus, the circuit's true function (which is meant to be kept secret) can be voided, rendering the original functional state of the circuit indiscernible and non-functional. These embodiments cause obscurity from the manufacturing process because the reverse engineer cannot detect which e-fuses are intentionally blown as part of the manufacturing or initialization process and which are blown in response to tampering with the circuit.

The decoy fuses may be programmed during the manufacturing process using a first set of external fuse programming pins input to the ASIC. The set of anti-tamper e-fuses, controlled by a second set of fuse programming input pins, are programmed by an electrical discharge sourced from tamper detect circuit in response to a tamper event (such as when an anti-tamper circuit detects that the ASIC's enclosure is violated or senses a temperature or pressure deviation, etc.). The input pins of both the set of decoy fuses and the set of anti-tamper fuses may be electrically coupled external to the ASIC to the same circuit output of the tamper response circuitry. With this configuration each fuse acts like a binary output, so that an individual signature can be structured within the circuit. This signature may be similar to the security provided by a cryptographic key and may comprise 256 bits or more.

The selection and placement of both the decoy set and the set of anti-tamper e-fuses may be performed by ASIC logical-physical synthesis software. The synthesis software could specify the inclusion of fuse states required both to enable functionality (e.g., through use of the decoy fuses) and to disable functionality (e.g., through use of anti-tamper fuses). The apparently unpredictable nature of the synthesis tool can further thwart reverse engineering should someone obtain knowledge of the tamper synthesis software. Logic functions incorporated within the ASIC design are targeted by the tamper synthesis tool and are "tamper synthesized" to incorporate fuses that source appropriate values commensurate with the fuse set. Tamper synthesis can perform one or more of the following operations: (a) replace logic gates with the same function gate having an additional input to accommodate the e-fuse value; (b) insert new logic gates controlled by e-fuses in existing logic paths; and (c) create and insert new combinatorial logic function (logic gates, latches, etc.) using existing design outputs (outputs sourced from within the ASIC from logic gates, arrays, latches, and ASIC primary inputs) as inputs to the new function and properly combine this new function with an existing ASIC's functionality, thereby controlling a new function and preventing it from becoming combined or enabled with a secret function until a tamper event is detected.

Before transformations are performed by the tamper synthesis tool, the tool analyzes the overall design and the targeted design cone or cones to determine which transformation is most appropriate to achieve obscurity and may also employ other considerations, such as design cost. Additionally, the tamper synthesis tool may be responsible for physical placement of the e-fuses on the ASIC die such that a first set of e-fuses are placed in close spatial proximity to a second set of fuses, thereby hampering thermal imaging technology from differentiating an e-fuse belonging to a set of decoy e-fuses from that of an anti-tamper e-fuse set.

In a more complicated embodiment, this concept can be extended by using three or more fuse sets to achieve additional advantages (e.g. greater security, ease of physical synthesis). Additionally, in another embodiment, manufacturing and ASIC e-fuse circuit techniques can be employed to eliminate the need for a second set of e-fuse programming pins by controlling both the set of decoy e-fuses and the set of anti-tamper e-fuses using the same programming pin interface.

While the disclosed embodiments show fuses being used as the selective coupling elements, it should be readily understood that other types of selective coupling elements could be used without departing from the scope of the claims below. For example, one embodiment could employ a programmable circuit or a feedback circuit that locks itself into a predetermined state when subjected to a predetermined stimulus.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A circuit that employs an anti-tamper sensor, comprising:
   a. a circuit element that is responsive to a first input and to a second input;
   b. a selective coupling element that couples the circuit element to the first input, the first selective coupling element responsive to the anti-tamper sensor and having a first state that allows the circuit element to operate normally when the anti-tamper sensor does not detect a tamper condition, the first selective coupling element also configured to enter a second state that causes the circuit element to become inoperable when the anti-tamper sensor detects a tamper condition;
   c. a decoy coupling element that is disposed between the second input and the circuit element and that has an appearance corresponding to the selective coupling element but that will cause the circuit element not to operate normally if the decoy coupling element has a selected physical property of the selective coupling element in the first state;
   d. a plurality of decoy fuses that is each placed in a different circuit path; and
   e. a circuit element configured so that when only a preselected subset of the plurality of decoy fuses is blown, the circuit will operate normally and so that when any of the plurality of decoy fuses that is not in the preselected subset is blown or when any of the fuses that is in the preselected subset is not blown the circuit will operate malfunction.

2. The circuit of claim 1, wherein the circuit element comprises an electronic circuit.

3. The circuit of claim 2, wherein the electronic circuit comprises an integrated circuit.

4. The circuit of claim 1, wherein the selective coupling element comprises a fuse.

5. The circuit of claim 4, wherein the first state comprises the fuse being intact and wherein the second state comprises the fuse being blown.

6. The circuit of claim 1, wherein a set of the decoy fuses is placed adjacent a corresponding set of non-decoy fuses thereby interfering with an attempt to detect decoy fuses through imaging of the circuit.

7. The circuit of claim 1, wherein the selective coupling element comprises a reverse fuse that changes from a non-conductive state to a conductive state when subjected to a predetermined stimulus and wherein the first state comprises the reverse fuse being in the non-conductive state and wherein the second state comprises the reverse fuse being in the conductive state.

8. The circuit of claim 1, wherein the decoy coupling element comprises a fuse that is blown prior to initial operation of the circuit element.

9. The circuit of claim 8, wherein the selected physical property of the selective coupling element is the fuse being in an intact state.

10. The circuit of claim 1, wherein the circuit element is configured to produce erroneous data if the decoy coupling element has the selected physical property of the selective coupling element.

11. A reverse engineering-resistant circuit that employs an anti-tamper sensor, comprising:
   a. a first fuse, configured to blow when the anti-tamper sensor detects a tampering condition, that is integrated with the circuit so as to render the circuit inoperable when the first fuse is blown;
   b. a decoy fuse that is blown prior to initial operation of the circuit and that is configured so that if a copy of the circuit is made with the decoy fuse intact, then the copy of the circuit will not operate normally;
   c. a plurality of decoy fuses that is each placed in a different circuit oath: and d. a circuit element configured so that when only a preselected subset of the plurality of decoy fuses is blown, the circuit will operate normally and so that when any of the plurality of decoy fuses that is not in the preselected subset is blown or when any of the fuses that is in the preselected subset is not blown the circuit will operate abnormally.

12. The circuit of claim 11, wherein the first fuse couples a first signal to a first gate that causes the circuit to be in an operable state when the first signal propagates to the first gate.

13. The circuit of claim 11, wherein the decoy fuse couples a second signal to a second gate that causes the circuit to be in an inoperable state when the second signal propagates to the second gate.

14. The circuit of claim 11, wherein the electronic circuit comprises an integrated circuit.

15. A method of preventing tampering with and reverse engineering of a circuit that is equipped with an anti-tamper sensor, comprising the steps of:
   a. coupling at least one anti-tamper fuse into a first selected circuit path so that the circuit will operate normally if the fuse is intact and so that the circuit will not operate normally if the fuse is blown, the anti-tamper fuse responsive to the anti-tamper sensor so that the anti-tamper fuse blows when the anti-tamper sensor detects a tamper condition;
   b. coupling at least one decoy fuse into a second selected circuit path so that the circuit will operate normally if the decoy fuse is blown and so that the circuit will not operate normally if the decoy fuse is intact;
   c. blowing the decoy fuse prior to initial operation of the circuit;
   d. placing a plurality of decoy fuses in different circuit paths;
   e. configuring the circuit so that blowing only a preselected subset of the plurality of decoy fuses will allow the circuit to operate normally and so that blowing any of the plurality of decoy fuses that is not in the preselected subset or not blowing any of the fuses that is in the preselected subset will cause the circuit to operate abnormally; and
   f. blowing the preselected subset of fuses prior to initial operation of the circuit.

16. The method of claim 15, further comprising the step of coupling an erroneous data signal to the decoy fuse so that if a copy of the circuit is made with the decoy fuse intact then the erroneous data will propagate into the circuit.

17. The method of claim 15, further comprising the step of placing the decoy fuse within a predefined range of the anti-tamper fuse so as the inhibit detection of a blown decoy fuse by an imaging system.

* * * * *